May 18, 1937.    W. HAGEN ET AL    2,080,914
GASEOUS ELECTRIC DISCHARGE LAMP
Filed Jan. 14, 1936
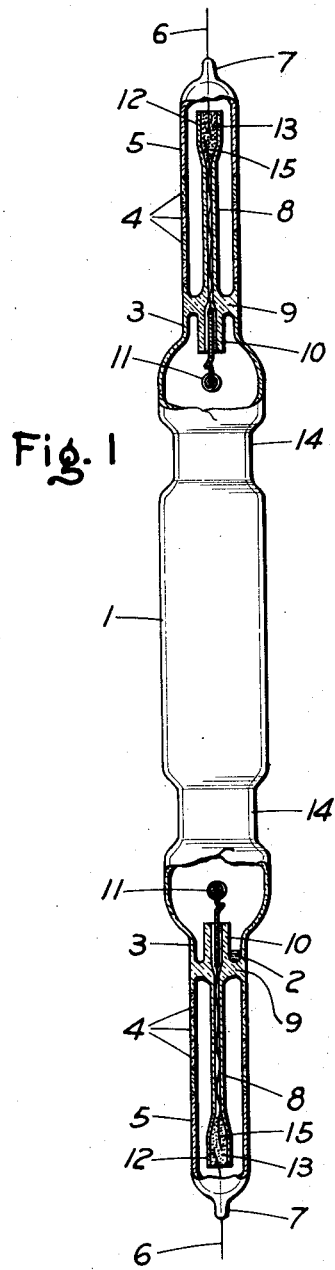
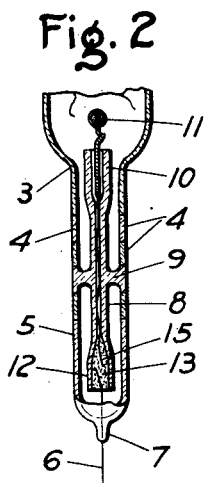
INVENTORS
Wilhelm Hagen
Hermann Krefft
Hermann Kummer
BY Harry E. Dunham
ATTORNEY Patented May 18, 1937

2,080,914

UNITED STATES PATENT OFFICE 2,080,914

GASEOUS ELECTRIC DISCHARGE LAMP

Wilhelm Hagen, Berlin, Hermann Krefft, Berlin-Friedrichshagen, and Hermann Kummer, Neuenhagen-sud, near Berlin, Germany, assignors to General Electric Company, a corporation of New York Application January 14, 1936, Serial No. 59,126
In Germany January 19, 1935

1 Claim. (Cl. 176—126)

The present invention relates to gaseous electric discharge lamps generally.

Electric discharge vapor lamps which are designed to operate at high container temperatures, such as the recently developed high intensity metal vapor arc lamps, are advantageously made of fused silica or the like. When fused silica is used as the container material it is customary to use a graded seal between the metallic leads and the fused silica. We have observed that the graded seals are deleteriously affected by the hot, ionized vapor in such devices and have, therefore, a short life.

The object of the present invention is to provide a novel gaseous electric discharge device having a container of fused silica or the like. Another object of the invention is to provide means to protect the graded seal in such structure from the deleterious effects of the gaseous electric discharge therein. A further object of the invention is to provide a novel seal for containers of fused silica or the like. Still further objects and advantages of the invention will be apparent to those skilled in the art from the following particular description and the appended claim.

In accordance with these objects a gaseous electric discharge lamp embodying the present invention comprises a tubular container of fused silica having at each end thereof a tubular graded seal, parts of which are deleteriously affected by the hot, ionized gaseous atmosphere during the operation of the lamp, and a capillary tube structure, resistant to the effects of the gaseous atmosphere, mounted in the tubular graded seal and closing off the space in said container from the space enclosed by the part of the graded seal comprising those parts thereof which are deleteriously affected by the hot, ionized gaseous atmosphere in said lamp during the operation thereof. The capillary tube is fused to the container or the graded seal at a part thereof between the discharge space and the parts of the graded seal requiring protection from the hot, ionized gaseous atmosphere. The end of the capillary tube remote from the electrode is sealed by an electrically conducting material. The capillary tube surrounds the current lead for the electrode adjacent the end of the container and supports said electrode. The current lead surrounded by the capillary tube is of a material having a high melting point, such as tungsten, and has a diameter of from 0.1 to 0.5 mm. This current lead terminates in the body of the sealing material in the end of the capillary tube as does the current lead fused into the graded seal. These current leads can be of different material and of different diameter and are electrically connected by the sealing material.

The gaseous electric discharge lamp described above has a long useful operating life since the parts of the graded seal subject to attack by the hot, ionized gaseous atmosphere are protected from such attack in the lamp embodying the present invention.

In the drawing accompanying and forming part of this specification two embodiments of the invention are shown, in which Fig. 1 is a front elevational, partly sectional view of a gaseous electric discharge device embodying the invention and Fig. 2 is a fragmentary, sectional view of a seal structure embodying the invention and useful in the device illustrated in Fig. 1.

Like numbers denote like parts in both the figures.

Referring to Fig. 1 of the drawing the gaseous electric discharge device comprises an elongated, tubular container 1 consisting of quartz and having a starting gas therein, such as argon, krypton, neon, or xenon, or a mixture of such gases and a quantity 2 of vaporizable material, such as mercury cadmium, zinc, thallium, caesium, or alloys, amalgams or mixtures of such materials, such as an alloy of mercury and cadmium, or mercury and caesium.

Said container 1 has at each of its ends a reduced part 3 to which is fused a graded seal having parts 4 consisting of glass having different coefficients of expansion. A glass tube 5 is fused to the graded seal and a current lead 6 is fused into said tube 5 at 7. A quartz capillary tube 8 having a thick portion 9 adjacent the inner end thereof is fused into the reduced part 3 of the container 1. Said tube 8 surrounds the current lead 15 of the electrode 11. The inner end 10 of the capillary tube 8 has a larger opening therein in which the coiled support wire of the electrode 11 is inserted. The electrode 11 is thus supported by capillary tube 8. The electrode 11 consists of a rod or bar comprising an electron emitting material, such as the oxide of an alkaline earth metal, and a filament of high melting point material, such as a tungsten filament, wrapped around said bar. The opposite end 12 of the capillary tube 8 is funnel shaped and is filled with an electrical conducting material 13, such as a sintered alloy of iron and nickel, which substantially closes the tube 8 so that the rate of diffusion of the vapor therethrough is imperceptible. The current leads 6 terminate in the material 13 and are electrically connected thereby to the electrode lead 15. The current leads 6 and 15 can be made of different material and of different diameters, when desired. We prefer to constrict the container 1 at 14 as shown.

The seal structure shown in Fig. 2 of the drawing is similar to those shown in Fig. 1 except that the thicker part 9 of the capillary tube 8 is approximately at the mid portion of said tube 8 and forms part of the graded seal. In this embodiment of the invention the capillary tube 8 consists of a glass resistant to the effects of the hot, ionized gaseous atmosphere and has a coefficient of expansion such that the parts 4 of the graded seal can be fused thereto without breaking strains being present in the graded seal. The parts 4 of the graded seal, as well as the fused joints therebetween, located between the constricted part 3 of the container 1 and the part 9 of the capillary tube 8 are likewise resistant to the effects of the hot ionized vapor.

While we have shown and described and have pointed out in the annexed claim certain novel features of the invention, it will be understood that various omissions, substitutions and changes in the forms and details of the device illustrated and in its use and operation may be made by those skilled in the art without departing from the broad spirit and scope of the invention, for example, the current lead 15 is fused into the capillary tube 8, when desired.

What we claim as new and desire to secure by Letters Patent of the United States, is:—

A gaseous electric discharge device comprising a sealed tubular envelope having a central portion of fused silica with ends of glass sealed thereto through a tubular graded seal, a gaseous atmosphere therein, inleads sealed through said glass ends, a pair of coaxial tubes of fused silica fused to the inner surface of said envelope adjacent opposite ends of the fused silica portion thereof, an electrode mounted on the inner end of each of said tubes and a current lead attached to said electrode and extending along the interior of said tube, a body of electrically conducting material mechanically closing the opposite end of said tube and electrically connecting said electrode lead and said inlead, each of said tubes extending past said graded seals to a point within said glass ends to protect said seals from the deleterious effects of the hot, ionized gas in said device.

WILHELM HAGEN.
HERMANN KREFFT.
HERMANN KUMMER.